US010701258B2

(12) United States Patent
Azegami (10) Patent No.: US 10,701,258 B2
(45) Date of Patent: Jun. 30, 2020

(54) CAMERA MANIPULATION DEVICE

(71) Applicant: KOWA COMPANY, LTD., Aichi (JP)

(72) Inventor: Tomohisa Azegami, Saitama (JP)

(73) Assignee: KOWA COMPANY, LTD., Aichi (JP)

( * ) Notice: Subject to any disclaimer, the term of this patent is extended or adjusted under 35 U.S.C. 154(b) by 0 days.

(21) Appl. No.: 16/474,620

(22) PCT Filed: Jan. 30, 2018

(86) PCT No.: PCT/JP2018/002836
§ 371 (c)(1),
(2) Date: Jun. 28, 2019

(87) PCT Pub. No.: WO2018/143148
PCT Pub. Date: Aug. 9, 2018

(65) Prior Publication Data
US 2019/0342486 A1  Nov. 7, 2019

(30) Foreign Application Priority Data
Jan. 31, 2017  (JP) .................. 2017-015096

(51) Int. Cl.
*H04N 5/232* (2006.01)
*H04Q 9/00* (2006.01)
*H04W 84/12* (2009.01)
*H04L 5/00* (2006.01)

(52) U.S. Cl.
CPC ....... *H04N 5/23203* (2013.01); *H04L 5/0055* (2013.01); *H04N 5/23206* (2013.01); *H04N 5/23261* (2013.01); *H04Q 9/00* (2013.01); *H04W 84/12* (2013.01)

(58) Field of Classification Search
CPC .............. H04N 5/23203; H04N 5/232; H04N 5/23206; H04N 5/232061; H04N 1/00103–00108; H04Q 9/00; G08B 13/1966; H04W 84/12; H04L 5/0055
See application file for complete search history.

(56) References Cited

U.S. PATENT DOCUMENTS 6,330,027 B1 * 12/2001 Haba .................. H04N 5/23203
348/211.99
6,469,737 B1 * 10/2002 Igarashi ............. H04N 5/23203
348/14.1

(Continued)

OTHER PUBLICATIONS

"Interface standard specifications for machine vision" issued on Jan. 2014 by Japan Industrial Imaging Association [Search on Jan. 11, 2017] <http://jiia.org/wp-content/themes/jiia/pdf/fsf.pdf> (English translation of relevant parts attached).

*Primary Examiner* — Abdelaaziz Tissire
(74) *Attorney, Agent, or Firm* — Duane Morris LLP (57) ABSTRACT

[Problem] To enable imaging to be performed with appropriate timing.
[Solution] In a camera manipulation device 1 according to the present invention, a trigger signal T12 is issued and imaging is begun when a prescribed command is transmitted from a control circuit side to an imaging unit side (see S12). Because the issuance of such trigger signal T12 is not accepted before a character reception start command is issued, it is possible to perform imaging with appropriate timing.

6 Claims, 8 Drawing Sheets

(56) References Cited

U.S. PATENT DOCUMENTS

| | | | |
|---|---|---|---|
| 6,573,931 B1* | 6/2003 | Horii | H04N 5/23203 |
| | | | 348/211.14 |
| 6,965,400 B1* | 11/2005 | Haba | H04N 5/232 |
| | | | 348/222.1 |
| 8,989,954 B1* | 3/2015 | Addepalli | H04W 72/0406 |
| | | | 701/32.3 |
| 2004/0218532 A1* | 11/2004 | Khirman | H04L 29/06 |
| | | | 370/235 |
| 2009/0201901 A1* | 8/2009 | Morioka | H04L 27/18 |
| | | | 370/338 |
| 2009/0251601 A1* | 10/2009 | Ihlefeld | H04N 5/0733 |
| | | | 348/521 |
| 2010/0085190 A1* | 4/2010 | Sueoka | H04Q 9/00 |
| | | | 340/572.7 |
| 2013/0100331 A1* | 4/2013 | Yanagidate | H04N 17/004 |
| | | | 348/333.01 |
| 2015/0359016 A1* | 12/2015 | Barany | H04W 76/10 |
| | | | 709/224 |
| 2017/0338909 A1* | 11/2017 | Azegami | H04L 1/0006 |
| 2018/0014352 A1* | 1/2018 | Yanagi | H04L 1/1671 |
| 2018/0027170 A1* | 1/2018 | Takahashi | H04N 5/23203 |
| | | | 348/211.1 |
| 2018/0139568 A1* | 5/2018 | Nakamura | H04W 4/70 |

\* cited by examiner

CAMERA MANIPULATION DEVICE

TECHNICAL FIELD

This invention relates to a camera manipulation device that is configured to perform imaging due to trigger signals through an imaging unit.

BACKGROUND ART

Various kinds of data communication standards for industrial digital cameras (simply "the cameras" hereinafter) are conventionally established (see Non-patent related document 1, for instance), and have respective characteristics and problems.

For instance, "CameraLink (registered trademark) standard" transmits 2 Gbps image data, conducts camera control, communicates and supplies power with one cable, but has such problems that the cable is expensive and a data transmission available distance (maximum cable length) is short, such as 10 m or so.

And, "GigE Vision (registered trademark) standard" realizes long data transmission available distance with a twisted pair cable, such as 100 m or so, but is vulnerable to electric noise even if a shielded twisted pair cable is used.

Furthermore, in "USB 3.0 standard" that is a general purpose data interface standard, the maximum data transfer rate is high speed, 5 Gbps, and transmission available distance of data is short, 5 m or so.

On the other hand, "CoaXPress standard" that has been released on December 2010 is for video supply, communication, control and power supply with one coaxial cable, and it enables data transmission up to 6.25 Gbps, output of camera control signals up to 20.8 Mbps, and 13 W power supply. In such a standard, data transmission available distance is 100 m or more in 1.25 Gbps. Its performance is attracting a great deal of attention.

PRIOR ART

Non Patent Related Document

Non-Patent related document 1: "Interface standard specifications for machine vision" issued on January 2014 by Japan Industrial Imaging Association [Search on Jan. 11, 2017] Internet <http://jiia.org/wp-content/themes/jiia/pdf/fsf.pdf>

SUMMARY OF INVENTION

Problems to be Solved by Invention

There are such needs that the above-mentioned camera is attached to an industrial robot, an object (the object that is machined and moved through the industrial robot) is sequentially imaged while the robot arm is moving, a posture of a robot arm is computed from encoder information of respective joints of the robot and the position of the object (the position on absolute coordinates) is computed from the images obtained. In such a mode, a timing of imaging through the camera is very important.

On the other hand, noise resistance is higher than the twisted pair cable since the coaxial cable is used in the above-mentioned CoaXPress standard. But, noises frequently occurs in a factory where industrial robots operate, and if a telegram having long length is shortened in order to improve robustness over noises, for instance, it is understood a different problem occurs. Concretely speaking, if a past style is modified into such a style that a trigger signal for starting imaging comprised of 6 characters in the standard is treated as the trigger signal with 3 of 6 characters. In such a case, a false trigger signal occurs due to noises though the trigger signal for starting imaging is not transmitted. When the imaging once starts through the camera due to such a false trigger signal, it is exposed for a preset time (10 to 200 msec for instance), the image data is transferred for a predetermined time (30 msec or so, for instance), and it is impossible to perform imaging again for up to 230 msec. Then, there is such a risk that it is not possible to image at a really desirable timing.

When the trigger signal on camera side becomes H due to noises, the command for making the trigger signal L is not issued and the state H is maintained. Then, there is such a problem that it is not possible to start next imaging.

An object of the invention is to provide the camera manipulation device for solving the above-mentioned problems.

Means for Solving Problems

Figure 1:
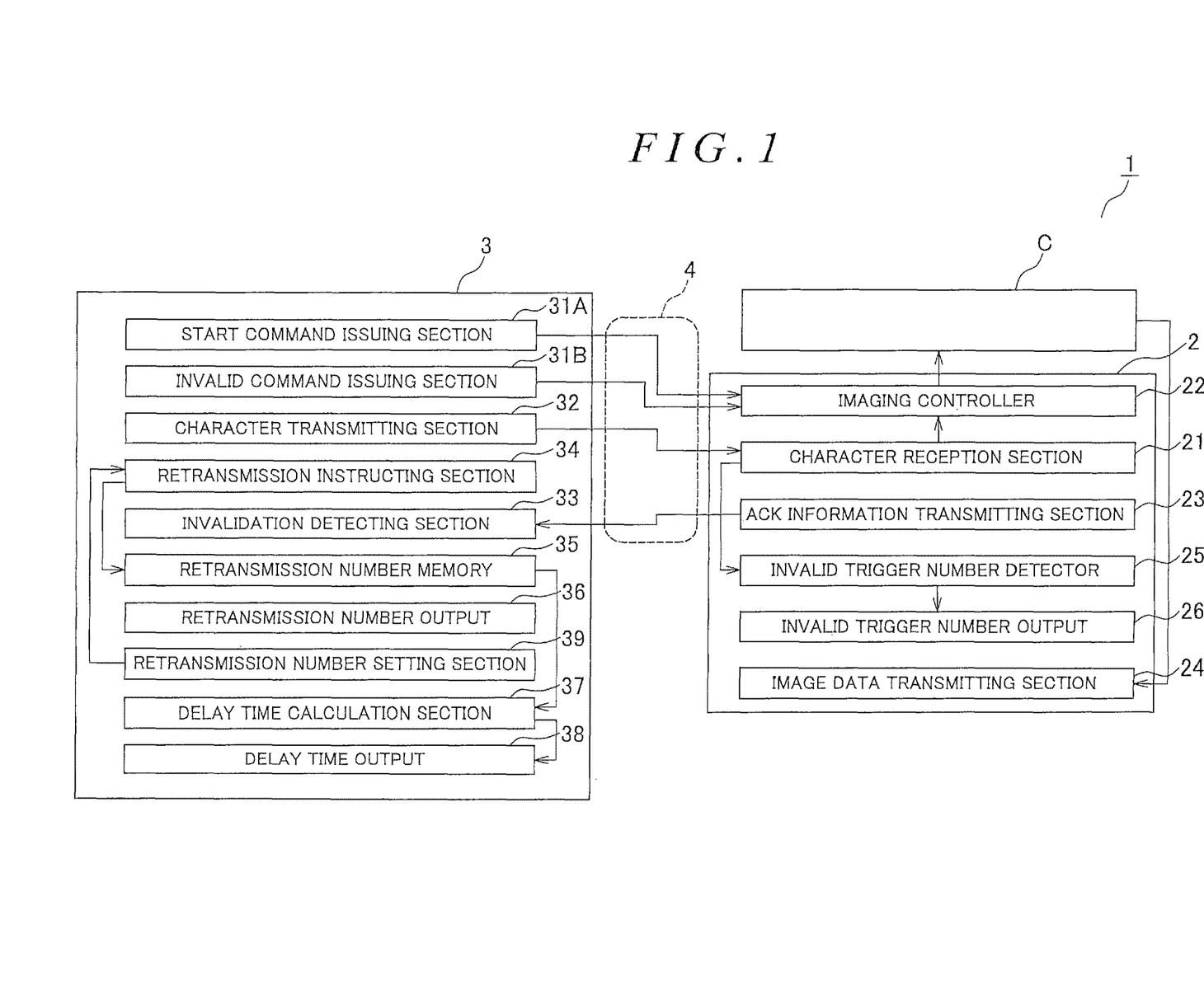
FIG. 1 is a block diagram that shows an instance of a configuration of a camera manipulation device according to the invention.

The first aspect of the invention is exemplarily shown in FIG. 1 and is a camera manipulation device (1) that is configured to perform imaging due to a trigger signal through an imaging unit (C), comprising:

a character transmitting section (32) that is located at a position apart from the imaging unit (C) and transmits n number of successive characters to the imaging unit side (C);

a start command issuing section (31A) that issues a character reception start command;

a character reception section (21) that is located on the imaging unit (C) side and receives the characters and judges whether m number of successive characters (m<n) are received; and an imaging controller (22) that outputs the trigger signal when the character reception section (21) judges that m number of successive characters are received after issuing the character reception start command and performs imaging through the imaging unit (C);

wherein a time width of m number of successive characters is (10×m/100M) sec or more and (10×m/20M) sec or lower.

The second aspect of the invention is the camera manipulation device, further comprising:

an ACK information transmitting section (23) that transmits trigger acknowledgement (ACK) information when the character reception section (21) acknowledges m number of successive characters;

an invalidation detecting section (33) that detects the ACK information transmitting section (23) in not transmitting the trigger acknowledgment (ACK) information though the character transmitting section (32) transmitted n number of successive characters; and a retransmission instructing section (34) that instructs the character transmitting section (32) to retransmit n number of successive characters when the invalidation detecting section (33) detects in not transmitting trigger acknowledgement (ACK) information.

The third aspect of the invention is the camera manipulation device, further comprising:

a retransmission number memory (35) that stores number of the retransmission of n number of successive characters through the character transmitting section (32); and a retransmission number output (36) that outputs the number of retransmission stored by the retransmission number memory (35).

The forth aspect of the invention is the camera manipulation device, further comprising:

a delay time calculation section (37) that calculates delay time of imaging through the imaging unit (C) from the number of retransmission stored by the retransmission number memory (35); and a delay time output (38) that outputs the delay time of imaging calculated by the delay time calculation section (37).

The fifth aspect of the invention is the camera manipulation device, further comprising:

a retransmission number setting section (39) that sets an upper limit of the number of instructions of retransmission by the retransmission instructing section (34).

The sixth aspect of the invention is the camera manipulation device, wherein after judging that the character reception start command is issued and m number of successive characters are received, the character reception section (21) ignores m number of successive characters transmitted later.

The number in parentheses shows the corresponding element in the drawings for the sake of convenience, accordingly, the descriptions are not restricted and bound by the descriptions on the drawings.

Effects of Invention

According to the first through sixth aspects of the invention, imaging through the imaging unit does not start even if a false command is transmitted to the character reception section due to noises and the like before issuing the character reception start command, so that it is possible to avoid such a situation that imaging is not performed at a timing when imaging is really to be performed.

According to the second aspect of the invention, when the character reception section is not possible to acknowledge m number of successive characters, n number of characters are retransmitted so as to perform imaging through the imaging unit.

According to the third aspect of the invention, an operator is able to know the number of retransmission.

According to the fourth aspect of the invention, an operator can judge whether the image obtained through the delayed imaging should be used, watching the delay time outputted.

According to the fifth aspect of the invention, it is possible to restrict the number of retransmission of n number of successive characters.

EMBODIMENTS FOR CARRYING OUT THE INVENTION

Embodiments of the invention are mentioned, referring to appended drawings FIGS. 1 to 8.

A camera manipulation device according to the invention is configured to perform imaging due to trigger signals (trigger signals on camera side) through a camera (an industrial camera), and has a circuit 2 on camera side that is located on an imaging unit C, and a control circuit 3 that is located at a position apart from the circuit 2 on camera side, as exemplarily shown in FIG. 1 with a reference number 1. The circuit 2 on camera side and the control circuit 3 are connected via coaxial cables 4.

Preferably, a start command issuing section 31A that issues a character reception start command (trigger valid command) and an invalid command issuing section 31B that issues a trigger invalid command when a predetermined time has passed after the start command issuing section 31A issued the character reception start command are located on the control circuit 3. An operator can freely adjust (set) a timing of issuing the character reception start command through the start command issuing section 31A. Adjustment means are a button, a rotary switch and a user interface on a screen of a personal computer that are manually operable by an operator, for instance. As exemplarily shown in FIG. 2, characters (falling triggers) are issued at a timing when the trigger signal T11 to be inputted into the control circuit 3 (trigger signal on control side) becomes L (see S14), and a timing when a trigger signal T12 (trigger signal on camera side) to be inputted into an imaging unit C (trigger signal on camera side) becomes L is not a timing when such a falling trigger is issued, but may be a timing when the trigger invalid command (see S13) is issued.

A character transmitting section 32 that is located at a position apart from the imaging unit C and transmits n number of successive characters (6 (six), for instance) to the imaging unit C side (that is, the circuit 2 on camera side) is located on the control circuit 3.

A character reception section 21 that receives the characters and judges whether m number of successive characters (m<n) are received is located on the imaging unit C side (that is, the circuit 2 on camera side).

Figure 2:
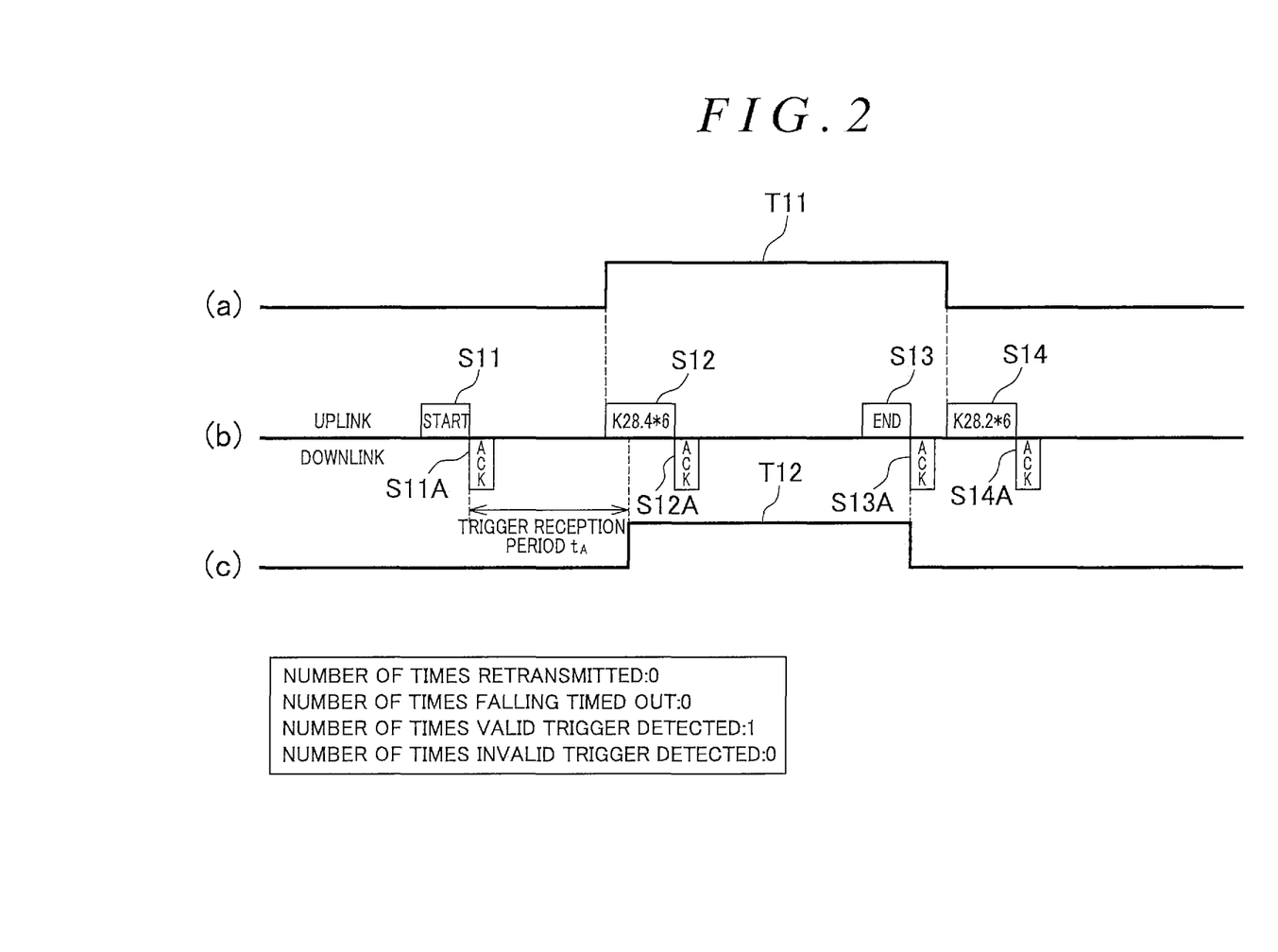
FIG. 2 is a timing chart that shows an instance of a signal transmission in the invention.

The characters that exemplarily shown in FIG. 2 with a reference number S12 are referred to as K codes, and the number of the characters is six (6). Such a character is converted with 8b/10b, and is transmitted at 10 bits (60 bits for six (6) characters in total).

An imaging controller 22 that controls the imaging unit C to outputs the trigger signal (trigger signal on camera side) and to perform imaging through the imaging unit C when judging that the character reception section 21 receives m number of successive characters after the character reception start command is issued located on the circuit 2 on camera side.

A time width (transfer time) of m number of successive characters is set to be (10×m/20.83M) sec or lower in case where a transmission bit rate is 20.83 Mbps. Concretely speaking, in a case of m=2, it is 0.96 μsec, and in a case of m=4, it is 1.92 μsec. The transfer time when the bit rate is 41.66 Mbps is set to be (10×m/41.66M) sec or lower, in a case of m=2, it is 0.48 μsec, and in a case of m=4, it is 0.96 μsec.

According to the invention, imaging through the imaging unit C does not start even if a false command is transmitted to the character reception section 21 due to noises and the like before issuing the character reception start command, so that it is possible to avoid such situation that imaging is not performed at a timing when imaging is really to be performed. Besides, according to the invention, the trigger signal on camera side becomes L by the trigger invalid command without fail after the trigger signal on camera side becomes H, so that it is possible to perform the next imaging.

On the other hand, an ACK information transmitting section 23 that transmits trigger acknowledgement (ACK) information when the character reception section 21 acknowledges m number of successive characters, an invalidation detecting section 33 that detects the ACK information transmitting section 23 in not transmitting the trigger acknowledgment (ACK) information though the character transmitting section 32 transmitted n number of successive characters, and a retransmission instructing section 34 that instructs the character transmitting section 32 to retransmit n number of successive characters when the invalidation detecting section 33 detects in not transmitting trigger acknowledgement (ACK) information may be located on control circuit 3. In such a case, when the character reception section 21 is not possible to acknowledge m number of successive characters, n number of characters are retransmitted so as to perform imaging through the imaging unit C.

Preferably, a retransmission number memory 35 that stores number of the retransmission (retry) of n number of successive characters through the character transmitting section 32, and a retransmission number output 36 that outputs (displays) the number of retransmission stored by the retransmission number memory 35 are located. In such a case, an operator is able to know the number of retransmission. Furthermore, preferably, a delay time calculation section 37 that calculates delay time of imaging through the imaging unit C from the number of retransmission stored by the retransmission number memory 35, and a delay time output 38 that outputs (displays) the delay time of imaging calculated by the delay time calculation section 37 are located. In such a case, an operator is able to judge whether an image obtained by delayed imaging can be used. The delay time output 38 are displays such as liquid crystal panels, and printers, for instance.

Preferably, a retransmission number setting section 39 that sets an upper limit of the number of instructions of retransmission by the retransmission instructing section 34 is located on the control circuit 3. In such a case, it is possible to restrict the number of retransmission of n number of successive characters. The retransmission number setting section 39 can be manually operated by an operator, and are buttons, rotary switches and user interface on a screen of a personal computer, for instance. The upper limit of the number of retransmission of n number of characters can be freely set, such as zero, twice, third time and one hundred times.

On the other hand, preferably, after judging that the character reception start command is issued and m number of successive characters are received, the character reception section 21 ignores n number of successive characters transmitted later. That is, preferably, only one trigger signal is accepted within one trigger reception period $T_A$. By doing so, if false trigger signals occur from the start of the trigger reception period $T_A$ to the transmission of regular characters (that is, till the n number of regular characters are transmitted from the character transmitting section 32 to the character reception section 21), the regular characters are not acknowledged as the trigger signal and the imaging unit C starts imaging only by the false trigger signal (that is, the imaging unit C starts imaging earlier than a regular timing). But, there are just a few gaps of the imaging timing and it does not interfere with practical use.

Preferably, an image data transmitting section 24 that transmits image data obtained from the imaging unit C to the control circuit 3 is located on the circuit 2 on camera side.

An invalid trigger number detector 25 that detects the number of transmission of the characters (that is, m number of successive characters) to the character reception section 21 after the trigger signal on camera side becomes H, and an invalid trigger number output 26 that outputs (displays) the number detected by the invalid trigger number detector 25 may be provided so as to output such a number. And, a valid trigger number detector (not shown) that detects the number of transmission (the number of valid trigger that is detected) of characters (the m number of characters) through which the trigger signal on camera side becomes H, and a valid trigger number output (not shown) that outputs (displays) the number detected by the valid trigger number detector may be provided so as to output the number. Furthermore, the number of transmission of the falling trigger through which the trigger signal on camera side does not become L (the number of falling timeout) may be detected so as to output such a number.

Embodiment 1

An embodiment 1 of the invention is now mentioned, referring to FIG. 2. A reference number T11 in FIG. 2(a) denotes the trigger signal on control side to be inputted into the control circuit 3, and an uplink of FIG. 2(b) denotes a timing of transmitting each command from the control circuit 3 to the circuit 2 on camera side, a downlink of FIG. 2(b) denotes a timing of returning the command from the circuit 2 on camera side to the control circuit 3, and a reference number T12 of FIG. 2(c) denotes the trigger signal on camera side transmitted from the control circuit 3 on camera side to the imaging unit C.

When issuing the character reception start command from the start command issuing section 31A of the control circuit (see S11), the acknowledgement (ACK) information is returned from the character reception section 21 (see S11A). Then, the above-mentioned trigger reception period $T_A$ starts and the imaging start through the imaging unit C is impossible before starting the trigger reception period $T_A$. When the trigger signal T11 on control side being inputted into the character transmitting section 32, the character transmitting section 32 transmits predetermined characters (that is, six (6) K codes) (S12). When the character reception section 21 receives the characters, the ACK information transmitting section 23 returns the acknowledgment (ACK) information to the character transmitting section 32 (S12A). When the character reception section 21 acknowledges any two successive characters of six ones, the imaging controller 22 outputs the trigger signal T12 on camera side and the imaging starts through the imaging unit C. On the other hand, when the invalid command issuing section 31B issues the trigger invalid command at a point of time when a predetermined time has passed after the start command issuing section 31A issued the character reception start command (see S13), the acknowledgment (ACK) information is returned to the invalid command issuing section 31B (see S13A) and the trigger signal T12 on camera side becomes L. It is necessary to issue such a trigger invalid command at a timing after the image has been transferred from the imaging unit C to the control circuit 3 side. Thereafter, the trigger signal (the trigger signal on the control side) to the control circuit 3 becomes L, and the falling trigger is transferred from the control circuit 3 to the circuit 2 on camera side (see S14), and the trigger signal T12 on camera side still be L.

Embodiment 2

Figure 3:
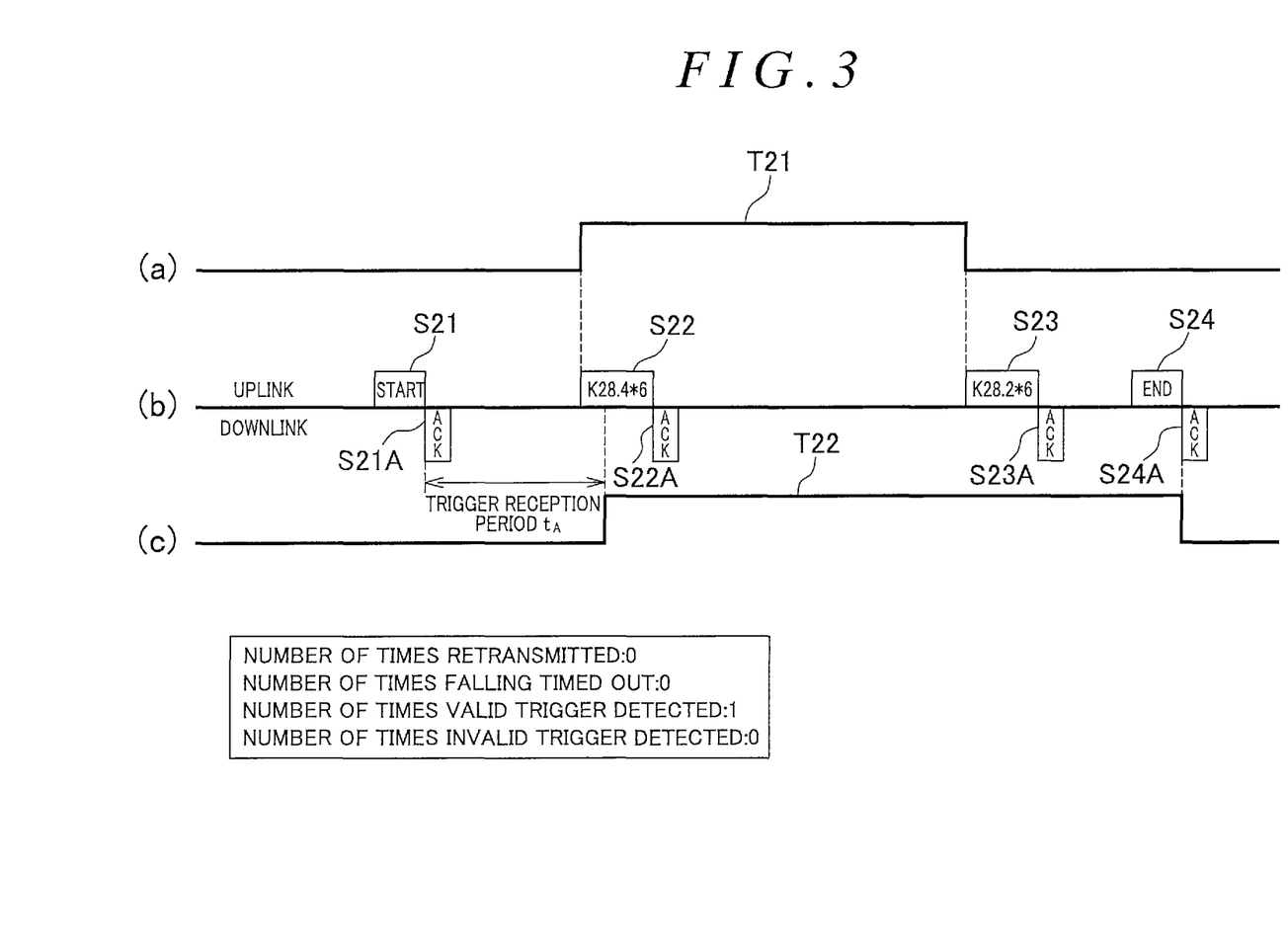
FIG. 3 is a timing chart that shows an instance of a signal transmission in the invention.

An embodiment 2 of the invention is now mentioned, referring to FIG. 3.

In a pattern exemplarily shown in FIG. 3, a trigger signal T21 on control side becomes L before a timing when issuing trigger invalid command (see S24) and a falling trigger is issued (see S23). A trigger signal T22 on camera side does not become L due to the falling trigger, and the trigger signal T22 on camera side becomes L at a timing when issuing the trigger invalid command.

Embodiment 3

Figure 4:
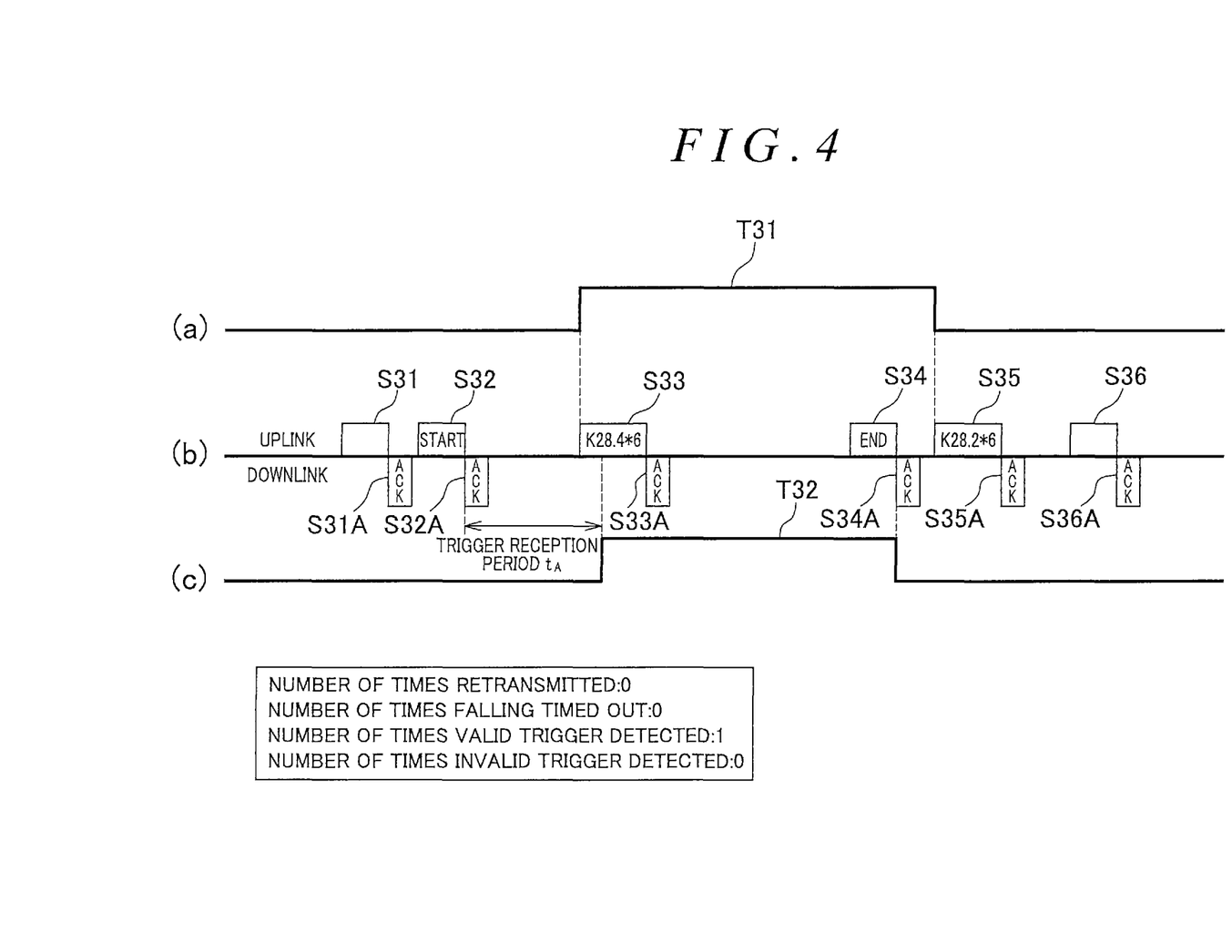
FIG. 4 is a timing chart that shows an instance of a signal transmission in the invention.

An embodiment 3 of the invention is now mentioned, referring to FIG. 4.

In an example as shown in FIG. 4, a false command is transmitted to the character reception section 21 before the start command issuing section 31A issues the character reception start command (see S31) and such a command is ignored. And, the false command is transmitted to the character reception section 21 after the trigger invalid command is issued (see S36), and such a command is ignored. At the result, a trigger signal T32 on camera side is issued on the basis of a normal command (see S33).

Embodiment 4

Figure 5:
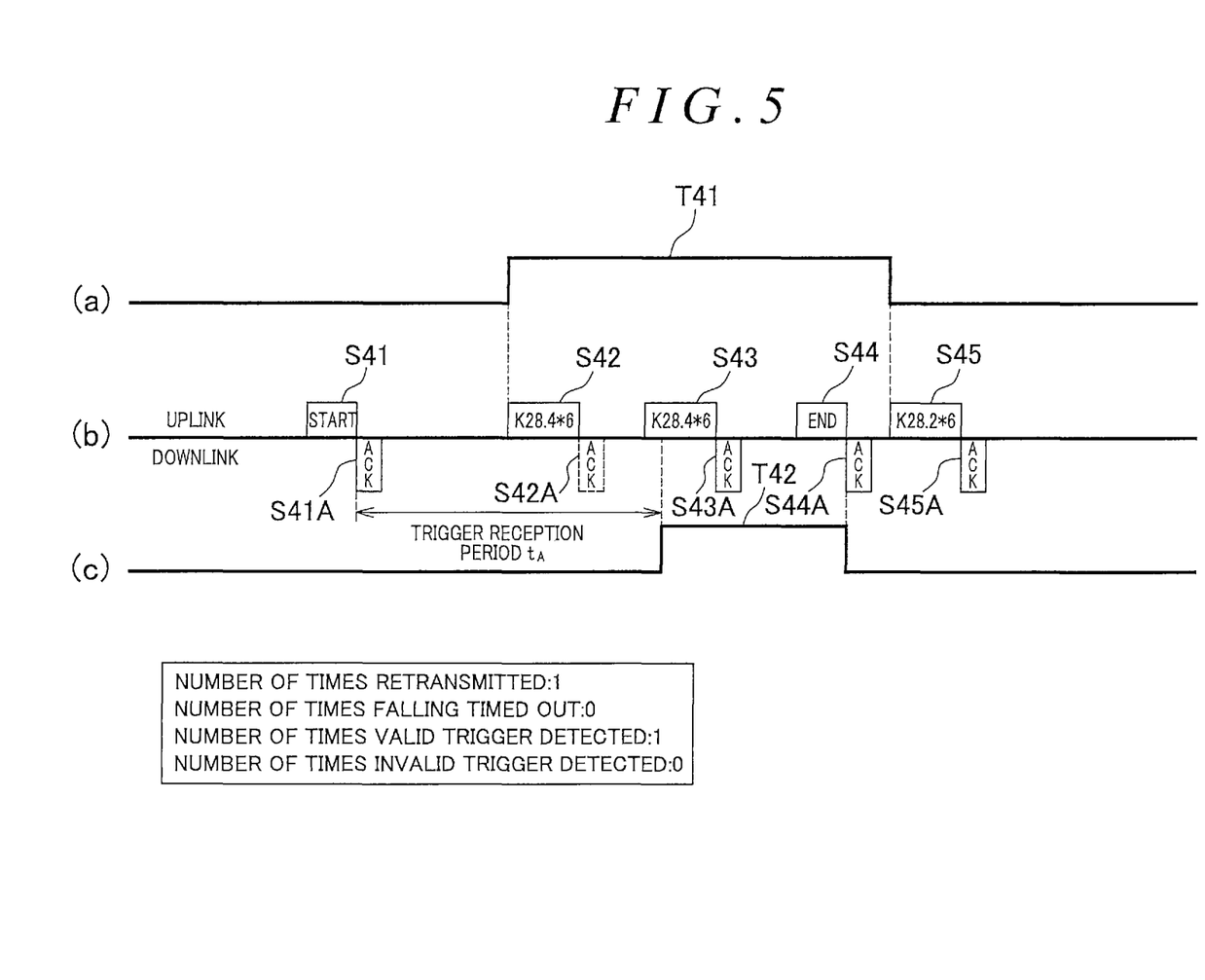
FIG. 5 is a timing chart that shows an instance of a signal transmission in the invention.

An embodiment 4 of the invention is now mentioned, referring to FIG. 5.

In an example as shown in FIG. 5, a regular command is transmitted to the character reception section 21 (see S42) and the ACK information transmitting section 23 does not return the trigger acknowledgment (ACK) information. Then, the characters are retransferred through an instruction of the retransmission instructing section 34 (see S43). And, a trigger signal T42 on camera side is issued on the basis of the retransmitted characters and the imaging starts.

In such a case, the retransmission number memory 35 stores the number of retransmission of the characters and the retransmission number output 36 outputs the number of retransmission "1". And, the delay time calculation section 37 calculates a delay time of imaging and the delay time is outputted through the delay time output 38. An operator may judge whether the image data obtained through the imaging should be used, watching the output.

Embodiment 5

Figure 6:
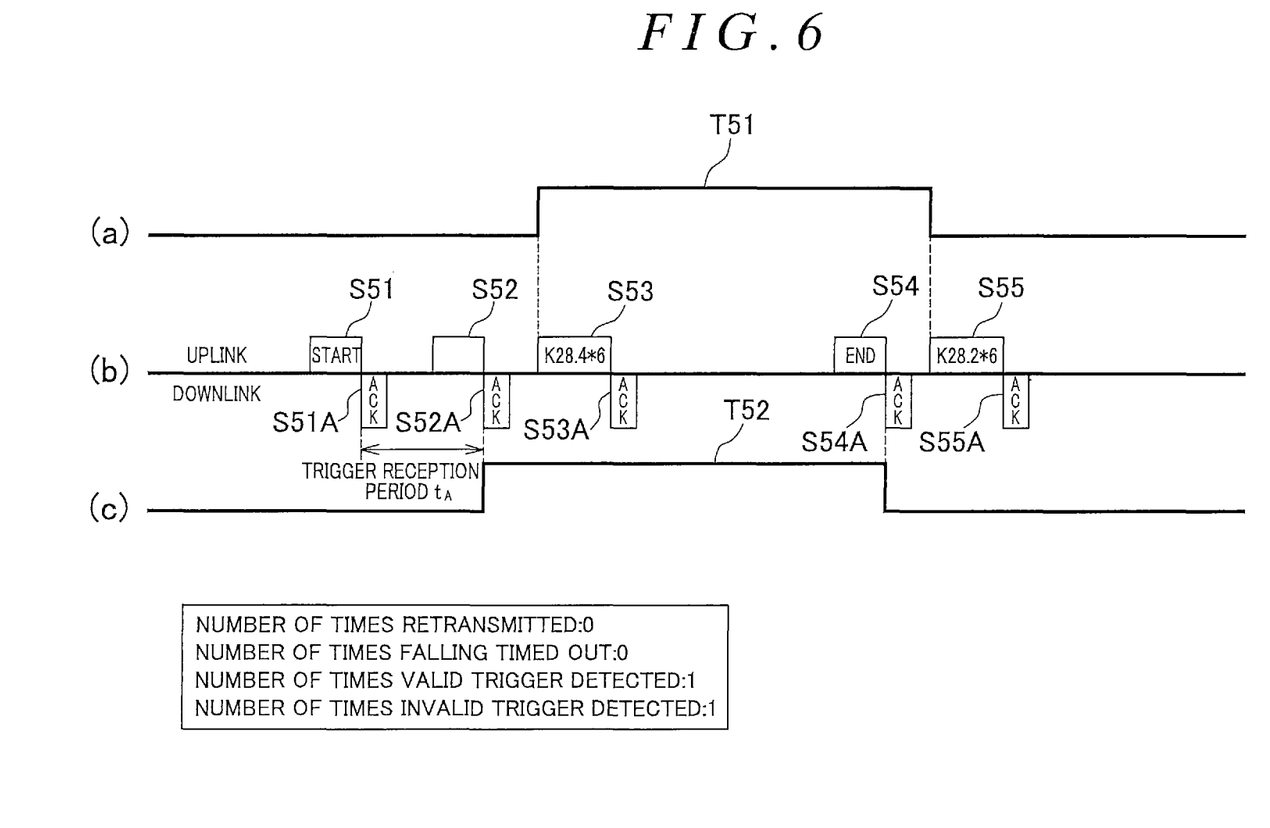
FIG. 6 is a timing chart that shows an instance of a signal transmission in the invention.

An embodiment 5 of the invention is now mentioned, referring to FIG. 6.

In an example as shown in FIG. 6, a false command due to noises is transmitted to the character reception section 21 between issuance of the character reception start command to the transmission of the regular command (that is, between S51 and S53) (see S52). Such a false command is not ignored and is acknowledged by the character reception section 21, and the imaging controller 22 issues a trigger signal T52 on camera side and imaging starts. That is, the trigger signal T52 on camera side is issued earlier than a regular timing and the imaging timing is shifted. In this embodiment, the characters (that is, m number of successive characters) are transmitted to the character reception section 21 after the trigger signal T52 on camera side becomes H, so that the invalid trigger number detector 25 detects such a number (that is, "1") and the invalid trigger number output 26 outputs it. Then, it is possible for an operator to know an occurrence of the invalid trigger and to take necessary procedures. If the time between the issuance of the character reception start command and the transmission of the regular command (that is, between S51 and S53) is relatively short, the imaging data obtained through the imaging due to the false command may be used. If such a time is relatively long, the imaging may be retried.

Embodiment 6

Figure 7:
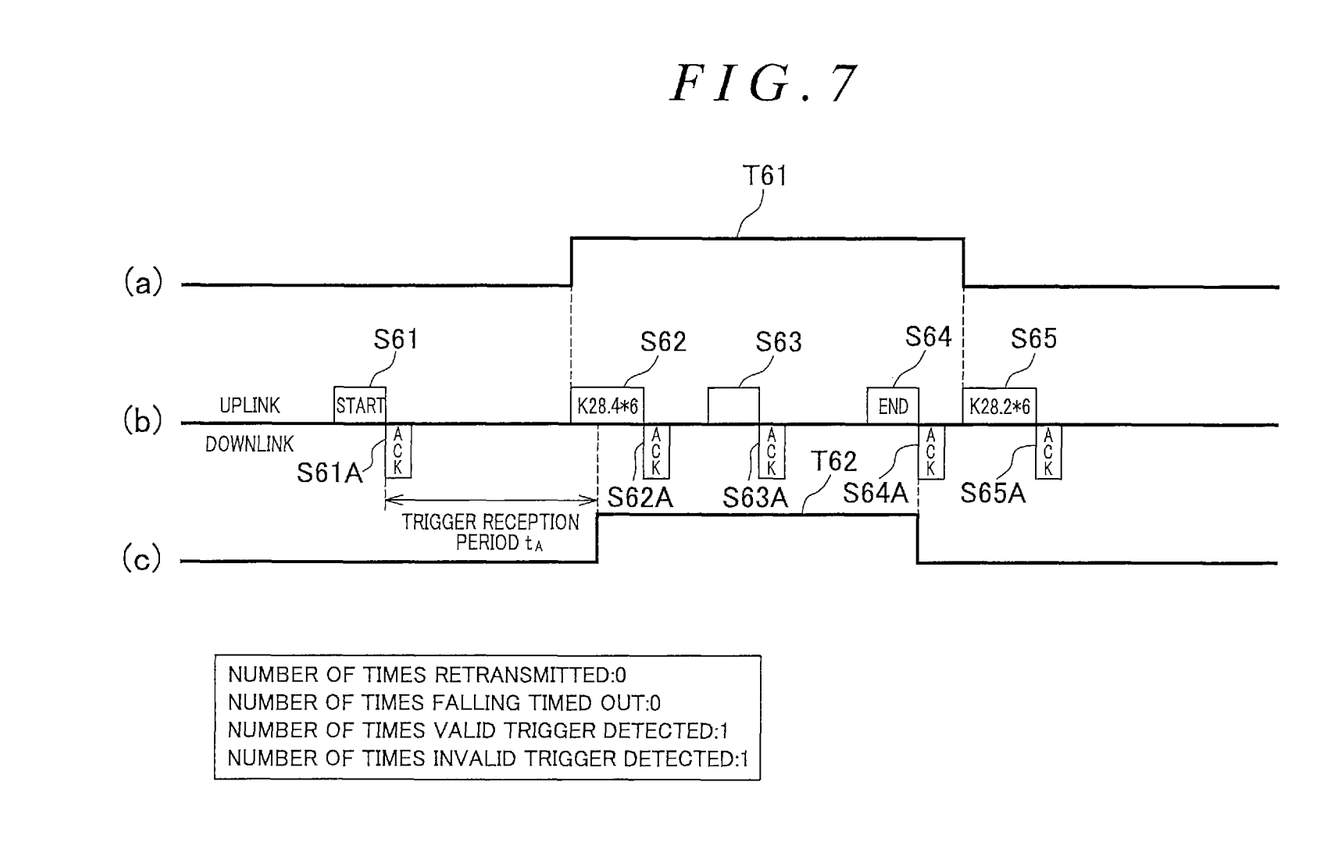
FIG. 7 is a timing chart that shows an instance of a signal transmission in the invention.

An embodiment 6 of the invention is now mentioned, referring to FIG. 7.

In an example as shown in FIG. 7, the false command is transmitted after the regular command is transmitted (see S 62). A trigger signal T62 on camera side is already H based on the regular command, so that the false command is ignored. In this embodiment also, the invalid trigger number detector 25 detects the number of the false command ignored and the invalid trigger number output 26 output such a number.

Embodiment 7

Figure 8:
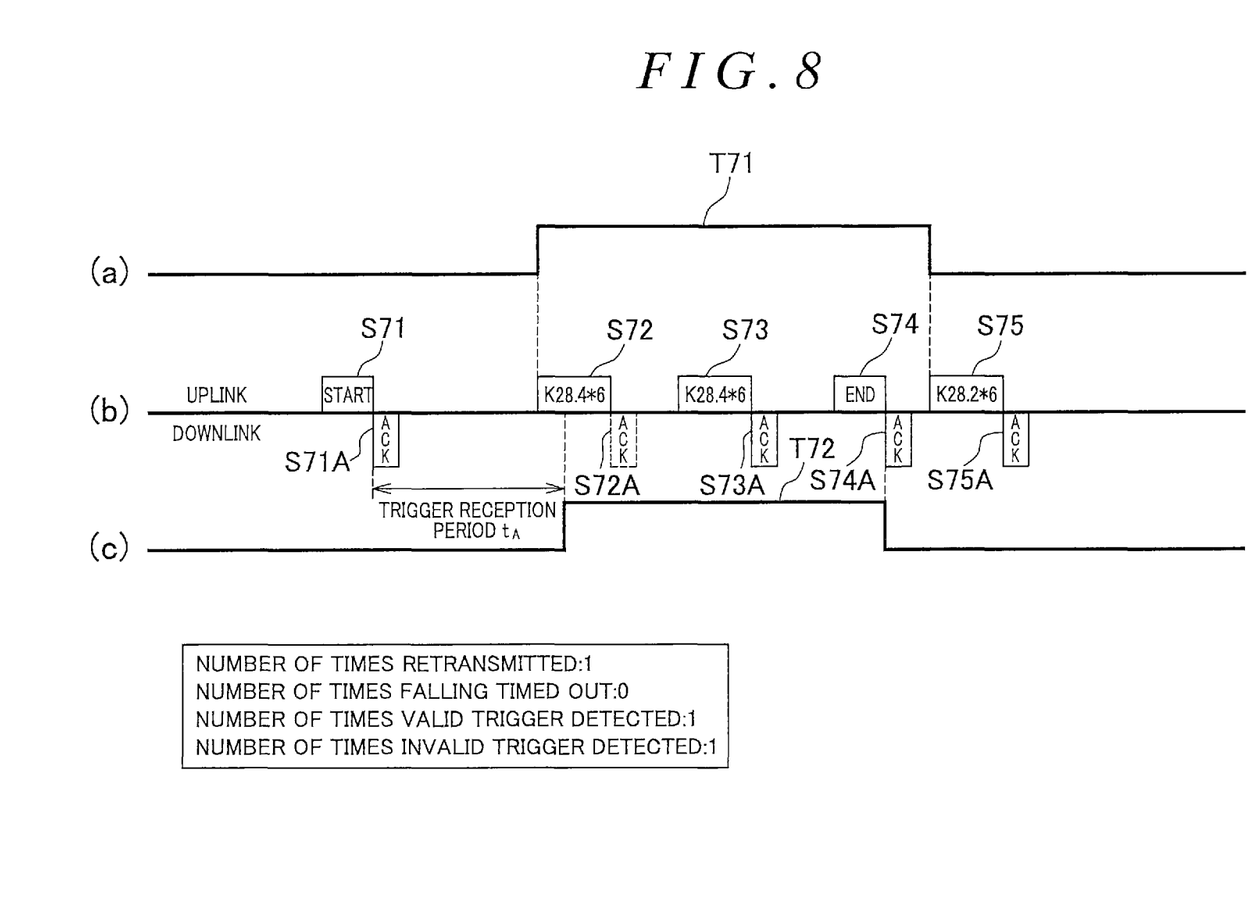
FIG. 8 is a timing chart that shows an instance of a signal transmission in the invention.

An embodiment 7 of the invention is now mentioned, referring to FIG. 8.

In an example as shown in FIG. 8, the regular command is transmitted (see S72), a trigger signal T72 on camera side becomes H and the imaging starts. But, the trigger acknowledgment (ACK) information is not transmitted (see S72A), so that the regular command is retransmitted (see S73). In such a case, the invalid trigger number detector 25 detects the number of the command ignored and the invalid trigger number output 26 outputs such a number.

INDUSTRIAL APPLICABILITY

The camera manipulation device according to the invention can be used between a controller and an industrial digital camera, or between a multiplexer and an industrial digital camera.

EXPLANATION OF REFERENCE NUMBERS 1 camera manipulation device
21 character reception section
22 imaging controller
23 ACK information transmitting section
31A start command issuing section
31B invalid command issuing section
32 character transmitting section
33 invalidation detecting section
34 retransmission instructing section
35 retransmission number memory
36 retransmission number output
37 delay time calculation section
38 delay time output
39 retransmission number setting section
C imaging unit

The invention claimed is:

1. A camera manipulation device that is configured to perform imaging due to a trigger signal through an imaging unit, comprising:
   a character transmitting section that is located at a position apart from the imaging unit and transmits n number of successive characters to the imaging unit side;
   a start command issuing section that issues a character reception start command;
   a character reception section that is located on the imaging unit side and receives the characters and judges whether m number of successive characters (m<n) are received; and
   an imaging controller that outputs the trigger signal when the character reception section judges that m number of successive characters are received after issuing the character reception start command and performs imaging through the imaging unit;
   wherein a time width of m number of successive characters is (10×m/100M) sec or more and (10×m/20M) sec or lower.

2. The camera manipulation device according to claim 1, further comprising:
   an ACK information transmitting section that transmits trigger acknowledgement (ACK) information when the character reception section acknowledges m number of successive characters;
   an invalidation detecting section that detects the ACK information transmitting section in not transmitting the trigger acknowledgment (ACK) information though the character transmitting section transmitted n number of successive characters; and
   a retransmission instructing section that instructs the character transmitting section to retransmit n number of successive characters when the invalidation detecting section detects in not transmitting trigger acknowledgement (ACK) information.

3. The camera manipulation device according to claim 2, further comprising:
   a retransmission number memory that stores number of the retransmission of n number of successive characters through the character transmitting section; and
   a retransmission number output that outputs the number of retransmission stored by the retransmission number memory.

4. The camera manipulation device according to claim 3, further comprising:
   a delay time calculation section that calculates delay time of imaging through the imaging unit from the number of retransmission stored by the retransmission number memory; and
   a delay time output that outputs the delay time of imaging calculated by the delay time calculation section.

5. The camera manipulation device according to claim 2, further comprising:
   a retransmission number setting section that sets an upper limit of the number of instructions of retransmission by the retransmission instructing section.

6. The camera manipulation device according to claim 1, wherein after judging that the character reception start command is issued and m number of successive characters are received, the character reception section ignores m number of successive characters transmitted later.

* * * * *